Sept. 1, 1959  R. C. FERGASON  2,901,876
COTTON STRIPPING DEVICE FOR COTTON HARVESTERS
Filed June 24, 1957  3 Sheets-Sheet 1

Inventor
Rector C. Fergason
By Ronald C. McGaughey
Attorney

Sept. 1, 1959 R. C. FERGASON 2,901,876
COTTON STRIPPING DEVICE FOR COTTON HARVESTERS
Filed June 24, 1957 3 Sheets-Sheet 2
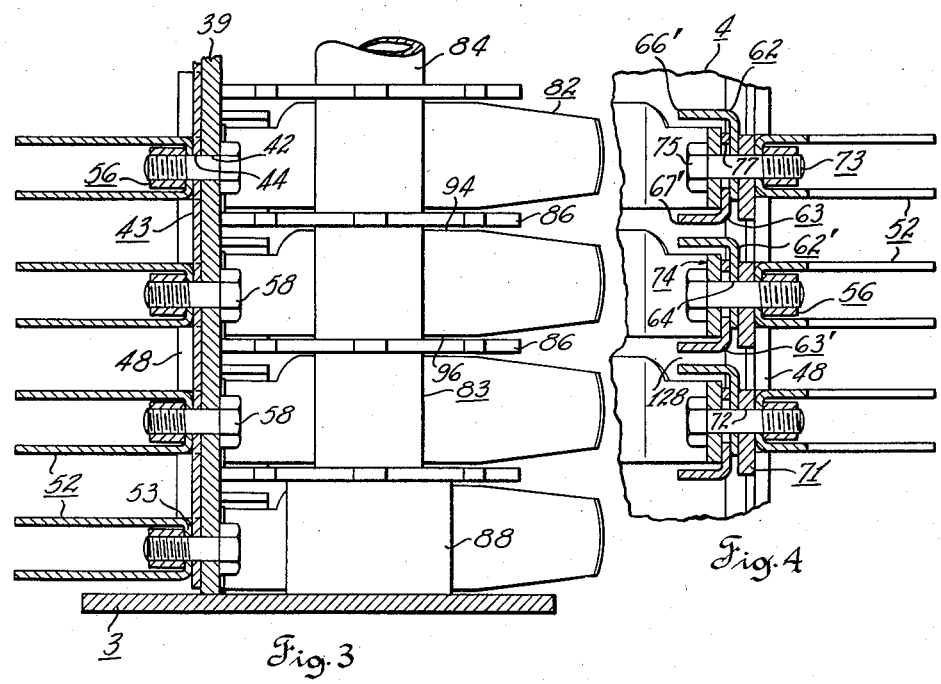
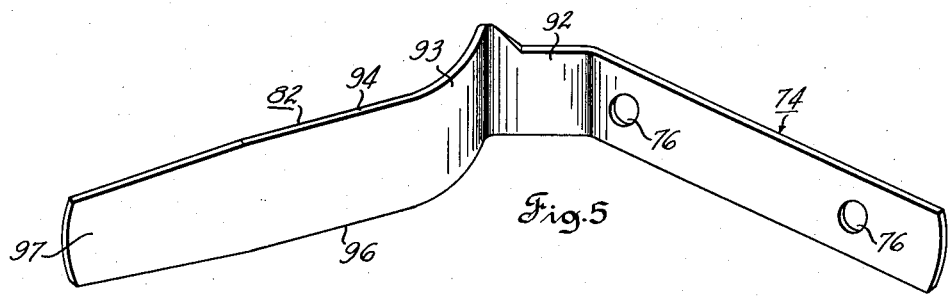
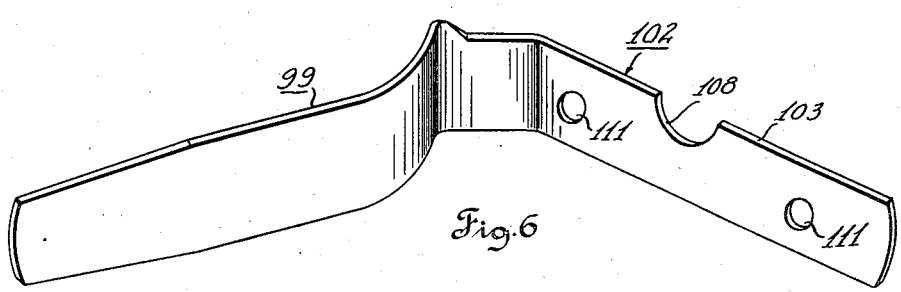
Inventor
Rector C. Fergason
By Donald C. McGaughy
Attorney

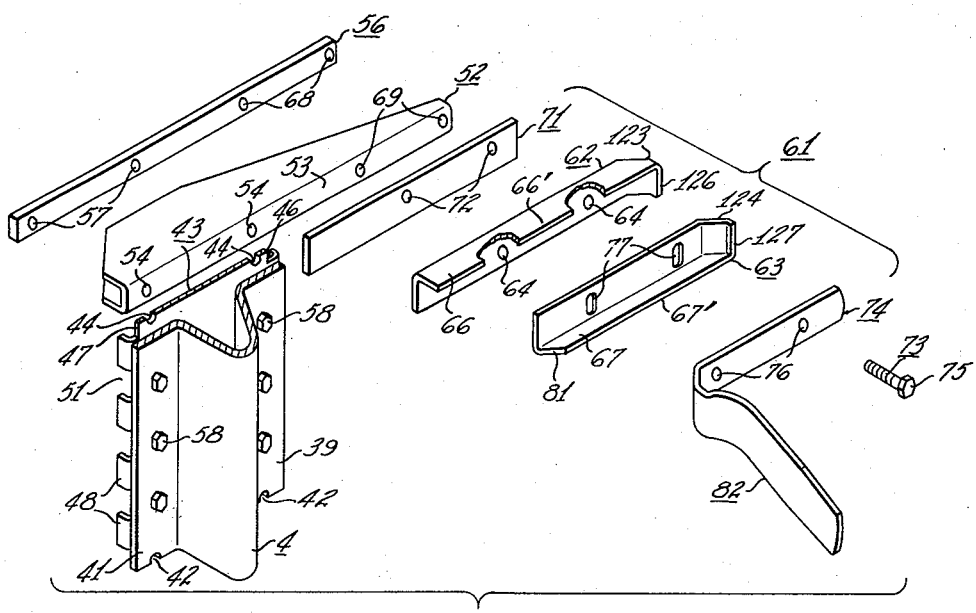

United States Patent Office 2,901,876
Patented Sept. 1, 1959

2,901,876

COTTON STRIPPING DEVICE FOR COTTON HARVESTERS

Rector C. Fergason, Gadsden, Ala., assignor to Allis-Chalmers Manufacturing Company, Milwaukee, Wis.

Application June 24, 1957, Serial No. 667,325

7 Claims. (Cl. 56—42)

This invention relates to cotton harvesters and it is concerned more particularly with a mechanism for removing picked cotton from a straight cylindrical rod type spindle by moving the cotton axially off one end thereof.

In cotton picking machines of the rotary spindle type as for example that shown in my U.S. Patent 2,671,298 it is the practice to rotatably mount the cotton picking spindles in uniform vertically spaced relation to each other on a vertically extending slat. A series of these slats are pivotally connected at their opposite ends to top and bottom chains which are driven in an oval path. The spindles of each slat are in horizontal alignment with the spindles of each of the other slats so that movement thereof will carry the spindles in oval vertically spaced horizontal paths of travel. Provision is made for causing rotation of the spindles on their axes while they are moved rearwardly through a picking tunnel in contact with the cotton plants. As the slats and cotton laden spindles emerge from the picking tunnel they pass about the rear of the oval path of chain travel and contact a positioning member which reclines the slats and spindles rearwardly preparatory to passage through a stripping mechanism. The slats then move forwardly outside of the picking tunnel. During forward travel the spindles are passed through a stationary comblike stripping assembly composed of vertically stacked stripping elements which remove the cotton as the spindles are drawn therethrough.

The stripping gaps which are defined by adjacent stripping elements must be accurately aligned with the vertically spaced horizontal paths of travel by the spindles in order that proper stripping action takes place. If any of the stripping gaps are off center of the paths of spindle travel the spindles will ride heavier on one edge than on the other with resulting uneven wear on the stripping edges and undue wear on the spindles. In stripping mechanisms as heretofore known it has been the practice to provide adjustable stripping edges on each side of the stripping gap. It is apparent that adjustability of both sides of the stripping gap provides a considerable margin of leeway as to possible location of the centers of the stripping gaps. In stripping mechanisms of this type it has been the practice to use expensive jigs or fixtures to accurately align and set the stripping gaps at the proper vertical spacing, that is, on center of the horizontal paths of spindle travel. In addition, such fixtures can only be used when the stripping assembly has been removed from the machine. In the field where use of such jigs or fixtures is not practical accurate realignment of the gap centers, as is necessary for example after replacing worn stripping elements, is very difficult if not impossible. It is desirable that the stripper assembly afford fast accurate alignment of the stripping elements to define stripping gaps on center with the horizontal paths of spindle travel without the necessity of expensive jigs or fixtures. In addition, the structure which affords accurate location of the stripping gaps should not interfere with the hereinbefore mentioned adjustability of stripping gaps.

Another problem arising in stripping mechanisms of this type is in regard to preventing passage of small amounts of cotton into the space between the stripping elements which results in plugging of the stripper and consequent bending or breaking of spindles. It is the practice to use rotating cleaners called "doffers" having teeth or similar projections sweeping over, under or in line with the tips of the spindles as they pass between the stripping elements to aid in removing the cotton. While such provisions do aid in removing the cotton from the spindle, the rotating doffers present the additional problem of shielding to prevent a winding up of cotton on the rotating doffer. The shielding structure for the doffer should cooperate with the stripping elements and the rotating projections on the doffer so as to present a minimum open area in the stripper assembly through which the cotton may be carried by the spindles and to eliminate insofar as possible any projections or crevices in which cotton or seeds thereof might wedge and plug the stripper.

Generally, it is an object of this invention to provide an improved stripper assembly for removing cotton from a rod type picking spindle which will take care of the hereinbefore outlined requirements in a fully satisfactory manner.

More specifically, it is an object of the present invention to provide a stripper assembly which will afford accurate adjustment of the stripping gaps on center with the horizontal paths of spindle travel without the necessity of using expensive complicated jigs or fixtures.

A further object of the invention is to provide a stripping assembly in which the stripping element defining one edge of a stripping gap is mounted in a predetermined position of adjustment without the use of special tools in line with one side of the path of spindle travel, the stripping element defining the other edge of the stripping gap at the other side of the path of spindle travel being adjustably mounted to provide for correct running clearance of the spindles between the adjacent stripping elements.

A still further object of the invention is to provide a stripper assembly of the hereinabove outlined type wherein the stripping elements are secured in position by locking structure formed integral with the shielding structure for the rotary doffer.

A still further object of this invention is to provide shielding structure for the rotary doffer which will cooperate with the stripper element assembly to present a minimum open area in the assembly through which cotton may pass.

The foregoing and other objects and advantages are attained by the present invention various novel features of which will be apparent from the description herein and the accompanying drawings disclosing an embodiment of the invention, and will be more particularly pointed out in the appended claims.

Referring to the drawings:

Fig. 3 is an enlarged sectional view of the stripper assembly taken on line III—III of Fig. 1;

Fig. 4 is an enlarged sectional view of the stripper assembly taken on line IV—IV of Fig. 1;

Fig. 5 is a perspective view of a clamping and doffer shielding element used in the stripper assembly shown in Fig. 1;

Fig. 6 is a perspective view of a modified form of the element shown in Fig. 5;

Fig. 7 is an enlarged perspective exploded view of a portion of the stripper assembly shown in Fig. 1;

Fig. 8 is a perspective view of a modified form of one of the stripper parts shown in Fig. 7; and Fig. 9 is a sectional view taken along the same line as Fig. 4 and showing the stripper shoe of Fig. 8 in installed position on the assembly.

Figures 1, 2:
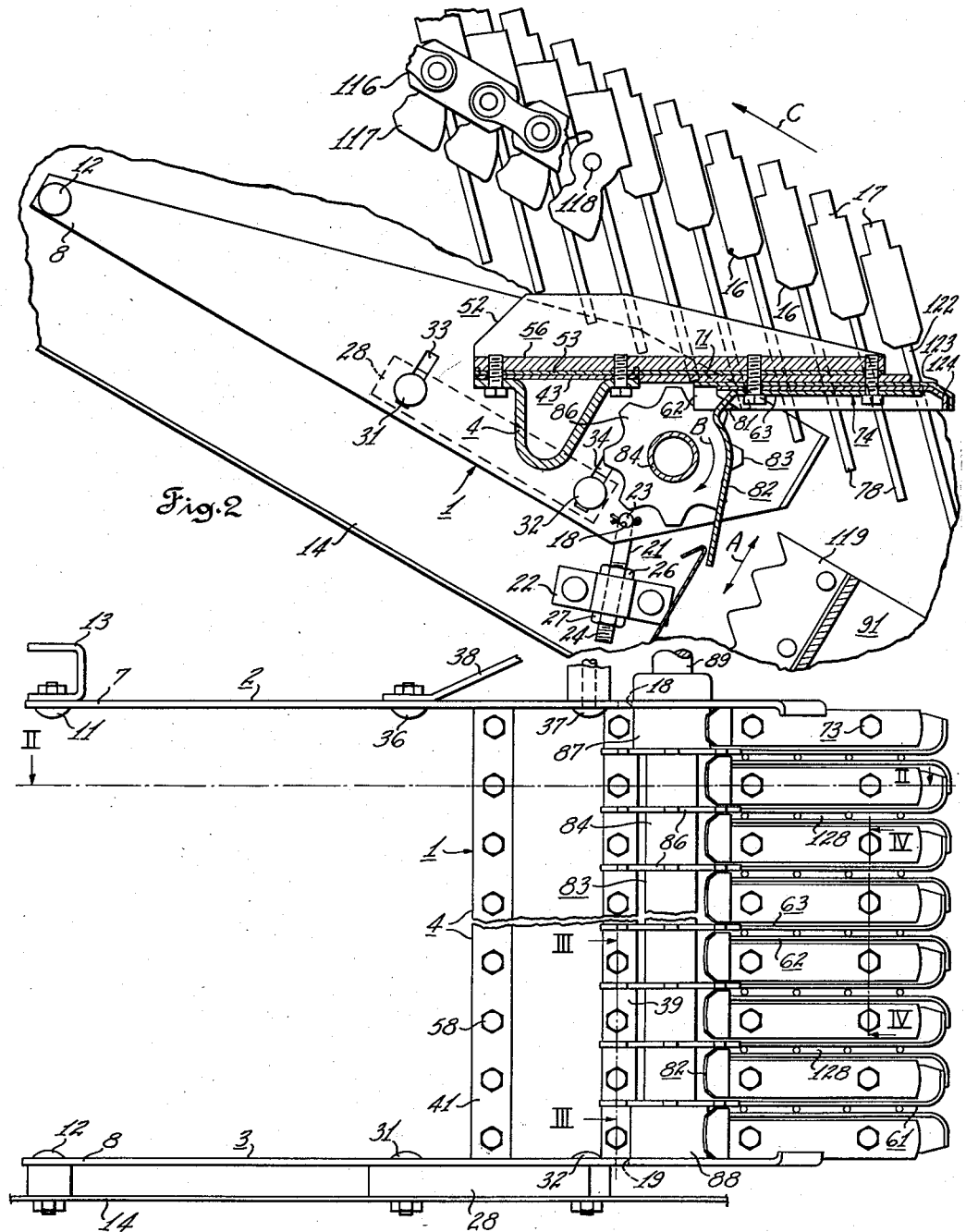
Fig. 1 is a fragmentary side elevation of a cotton stripper assembly in an installed position on a cotton harvester with some parts removed for purposes of disclosure.
Fig. 2 is a sectional view of the stripper assembly taken on line II—II of Fig. 1.

Referring to Figs. 1 and 2 the stripper support assembly generally indicated by the reference numeral 1 includes vertically spaced generally triangular shaped upper and lower mounting plates 2 and 3. The plates are connected together by a support or stripper bar post 4 which is fixedly secured at opposite ends to the plates 2 and 3 respectively, as by welding. The apex ends 7 and 8 of the plates 2 and 3 are apertured to receive pivot pins 11 and 12. The pins 11 and 12 are mounted on upper and lower frame members 13 and 14 which form part of the main frame structure of the cotton picking unit. The pivot mounting permits the aesmbly 1 to be moved closer or farther from the edges 16 of the spindle carrying slats 17 in the directions indicated by arrow A in Fig. 2. The purpose of this adjustment will be more fully explained hereinbelow.

The plates 2 and 3 are provided with apertures 18 and 19 adapted to receive upper and lower L-shaped holding bolts 21 only one of which is shown in Fig. 2. As these bolts and the mounting assembly therefor are identical, only the lower assembly for bolt 21 will be described. A U-shaped bracket 22 is rigidly mounted on frame member 14. The end portion 23 of bolt 21 is mounted in the aperture 19 in plate 3 and secured therein by a cotter key. The threaded end 24 of the bolt 21 is passed under the U-bracket 22 and inner and outer lock nuts 26, 27 are threaded on the bolt 21 in straddling relation to the U-bracket 22. It will be appreciated from the foregoing that adjustment of the nuts 26 and 27 by threading them in or out on the bolt 21 will afford inward or outward adjustment of assembly 1 as desired. A similar assembly is provided on the upper frame of the picking unit to adjustably lock the plate 2 in position.

To insure vertical rigidity of the assembly 1 on the frame a spacer bar 28 is snugly fitted between the bottom surface of plate 3 and the frame member 14. A pair of carriage bolts 31 and 32 are passed through slotted apertures 33 and 34 in plate member 3 and fastened with suitable nuts to lock the assembly in vertically fixed relation on the frame member 3. The upper plate 2 is provided with a pair of elongated apertures which are similar to lower plate apertures 33 and 34 and which also receive a pair of carriage bolts 36, 37 for mounting the top plate 2 on upper frame member 38 to additionally reinforce the assembly against vertical play. It will be understood that the carriage bolts 31, 32 and 36, 37 must be loosened prior to inner or outer adjustment of the assembly relative to the slats 17.

The stripper bar post 4 as shown in Figs. 2, 3 and 7, is generally U-shaped in cross section and includes inner and outer flanges 39 and 41. The flanges each are provided with a series of uniform vertically spaced apertures 42, the apertures of flange 39 being in horizontal alignment with the apertures in flange 41. A vertically extending plate member 43 is mounted on post 4 in face to face relation with the flanges 39 and 41. The plate 43 is provided with a vertical series of pairs of horizontally aligned apertures 44 which are in registry with the apertures 42 in flanges 39 and 41. The vertical edges 46 and 47 of plate member 43 are notched to provide a vertically spaced series of horizontally aligned pairs of tab portions 48 which are bent to extend at right angles to the plane of plate 43. Adjacent ones of said tab portions 48 define a vertical series of horizontally aligned mounting spaces 51 therebetween adapted to receive and position a series of stripper element support members 52 as shown in Fig. 3.

As the support members 52 are identical in construction only one will be described in detail. Referring to Figs. 3 and 7 it will be seen that the support member 52 is channel shaped in cross section and fits snugly in the mounting space defined by adjacent pairs of tabs 48. The web portion 53 of the support member 52 is provided with a pair of horizontally spaced apertures 54 (Fig. 7) which register with the apertures 44 in plate 43 and apertures 42 in post 4. An elongated stiffener bar 56 is placed in face to face relation with web portion 53 and has a pair of threaded apertures 57 in registry with the apertures in the support member 52. To assemble the support member 52 on the post 4 a pair of cap screws 58 are passed through the aligned apertures of flanges 39, 41, plate 43 and web 53 of support member 52 and then threaded into the apertures 57 in the stiffener bar 56. It will be understood that each support member 52 is secured to the post 4 in an identical manner.

The assembly above described constitutes a support for a vertically spaced series of stripper elements or subassemblies 61 shown in exploded relation in Fig. 7. Each of the subassemblies is identical in construction and only one will be described in detail. The stripping element 61 includes an upper long shoe or first section 62 and a lower shorter shoe or second section 63, each section being L-shaped in cross section. The sections 62 and 63 have flange portions 66 and 67 presenting horizontal lower and upper stripping edges 66' and 67' respectively. The upper and lower sections are mounted on the support member 52 with the short section 63 in overlying relation to the long section 62.

In the embodiment disclosed in Figs. 4 and 7 the first section 62 is fixedly mounted on the support member 52 in a predetermined position of adjustment and the second section is mounted for vertical adjustment in a manner which will now be described. The stiffener bar 56 includes a second pair of threaded apertures 68 in registry with a corresponding second pair of apertures 69 in web 53. A spaced bar 71 is placed in face to face engagement with web 53 and has apertures 72 in registry with the pairs of apertures 68 and 69. The first section 62 has a pair of mounting apertures 64 dimensioned to snugly receive cap screws 73 and the second shoe 63 has a pair of vertically elongated mounting openings 77 dimensioned to loosely receive the cap screws 73. Adjustable connecting or releasable fastening means which includes clamping member 74 apertured at 76, and cap screws 73, rigidly secures the stripper elements 62 and 63 on the support 53. In assembly, cap screws 73 are passed through apertures 76 in clamping member 74, through the registering apertures in sections 63, 62, spacer 71, web 53 and then threaded into the stiffener bar 56 with the enlarged head portions 75 thereof in load transmitting engagement with clamping member 74.

Each stripper element or subassembly 61 is similarly mounted, and the cooperative relationship of a series of these elements is best shown in Figs. 1 and 4. The first sections in Fig. 4 are numbered 62 and 62' and the second sections 63 and 63', for purposes of analysis. The first sections 62 and 62' are fixed mounted on supports 52 to present their stripping edges 66' at predetermined vertical spacings from each other as determined by the centers of the cap screws 73. The shanks of the cap screws 73 act as gauging means which abut with the apertures or stop means 64 of the first sections 62 to determine this spacing. The second section 63 is mounted in overlying relation to the first section 62 and has its stripping edge 67' in adjacent stripping gap forming relation to the next lower first section 62'. This relationship is repeated for the entire assembly. In other words, a series of first stripping sections 62 are fixedly mounted on the support members 52 at predetermined vertical spacings from each other and a series of second sections 63 are mounted in adjustably fixed relation on the supports 52 in adjacent stripping gap forming relation to the first sections.

The spacing between adjacent first and second sections 62' and 63 is adjusted by loosening cap screws 73 and raising and lowering the second section within the limits of slotted openings 77. In actual practice the vertical spacing of the paths of spindle travel is uniform, as for example, at one and one-half inch centers. The vertical spacing for all mounting structures is then held to the same one and one-half inch centers with the apertures 64 in sections 62 set to present the stripping edges 66' at the same one and one-half inch centers and at one side of the path of spindle travel as shown in Fig. 1. The second sections 63 are then adjusted to place their respective stripping edges 67' in line with the other side of the path of spindle travel with sufficient running clearance provided between stripping edges 66' and 67' and the spindles 78. When the sections 62 and 63 are replaced due to wear the vertical spacing of the gap centers is not lost due to the fixed mounting of the first or long sections 62.

A doffer assembly 83 is mounted between plates 2 and 3 and includes an elongated hollow cylindrical element 84 (Figs. 1, 2 and 3) having a vertically spaced series of scalloped or toothed wheels 86 fixedly mounted thereon. The upper and lower plates 2 and 3 are provided with upper and lower antifriction bearings (not shown) carried in hub members 87 and 88. A stub shaft 89 is fixedly mounted in each end of cylindrical element 84, the upper and lower ends of stub shafts 89 being in turn rotatably mounted in the upper and lower bearings mounted in hub members 87 and 88, respectively. The upper end of stub shaft 89 is drivingly connected with the power train of the picking unit in a conventional manner. Further details of the operation of the doffer are not necessary to the understanding of the present invention, it being sufficient to know that the doffing element is rotated in the direction of arrow B shown in Fig. 1. In the installed position the doffing elements 86 form extensions of the stripping edges 67' of the short shoes 63, each of these shoes being notched as at 81 to provide running clearance for the elements 86. During rotation the toothed or scalloped doffing elements pass adjacent the upper side of the path of spindle travel as shown in Figs. 1 and 3 and serve to clean any wisps of cotton which may not be completely removed by the stripping elements 61 and to impel stripped cotton into an endless belt type elevating conveyer 91.

As shown in Fig. 2 it will be seen that the clamping member 74 which is part of the releasable connecting or fastening means is formed integral with a generally flat elongated stripped cotton deflecting guard member 82 which extends in generally oblique relation to the plane of elongated clamping member 74 in shielding relation to rotary doffer 83. Referring to the perspective showing of Fig. 5 and to Fig. 2, the clamping member 74 blends smoothly with the guard member 82 to virtually eliminate open area between the end of the stripper sections 62, 63 and the doffing elements through which cotton may pass or collect and plug. The guard member 82 has a narrow neck portion 92 of a width equal to that of clamping member 74 at the point at which it joins with the clamping element. This narrow portion provides clearance for passage of the spindle ends past the end of the stripping shoes as shown in Fig. 2. The guard member 82 then widens and is dimensioned at an arcuate intermediate portion 93 thereof to snugly interfit between adjacent doffing elements 86, sufficient running clearance as shown in Fig. 3 being afforded between the edges of 94 and 96 of the guard 82 and the adjacent ones of doffing elements 86 to prevent destructive contact therebetween. The guard 82 has a tapered outer end portion 97 which extends to a point beyond the doffing elements 86. This taper is provided so that any cotton which may hairpin over the guard will be moved or shed off of the outer end 97 by the action of subsequently stripped cotton. In other words, stripped cotton is constantly brushing against the elongated guard members in a sweeping action which is relied upon to keep cotton from building up around any part of the guard 82.

A modified form of the invention includes the stripper section 98 shown in Fig. 8 and the integral clamping strip and guard member 99 shown in Fig. 6. These elements are shown in assembled relation in Fig. 9. In the modified form the section 98 is identical in form with first sections 62 differing only in that it is provided with vertically elongated mounting apertures 101 which correspond to the circular mounting apertures 64 in the first sections 62. The section 98 replaces section 62 and in assembled condition the slotted apertures 101 register with the slotted apertures 77 in second section 63. The slotted apertures 101 and 77 permit both first and second sections to be adjusted vertically within the limits of the apertures as appears in Fig. 9. The modified form of the clamping member 74 used in this embodiment is shown in Fig. 6 and identified by the general reference character 102. It will be noted that the deflecting or guard member 99 thereof is identical in construction to the guard member 82 associated with clamping member 74. The member 102 however is widened to provide a clamping strip of greater width than that of the clamping strip 74 shown in Fig. 5. The additional width places the edge 103 at a predetermined spacing from mounting apertures 111 therein to operate as a gauge means to determine a desired position of vertical adjustment for the upper or first section 98. The inner side of flange 104 of section 98 constitute stop means 106 and the outer side of flange 104 presents a horizontal stripping edge 107.

In assembly both first and second sections 98 and 63 are loosely mounted by the cap screws 73 which are threaded into the bar 56. The section 98 is then moved downwardly until the stop means 106 on flange 104 comes into abutting relation with the gauging edge 103 of the clamping member 102. This engagement determines the proper setting of the upper section 98 so that the stripping edge 107 is accurately aligned with the lower side of the path of spindle travel. The section 63 is then moved downwardly to set the gap for proper running clearance. In the modified form of the invention the upper or first sections may be adjusted upwardly in order to narrow the stripping gap from the lower side if desired. To aid in adjusting the section 98 upwardly a small semicircular cutout 108 is provided in the clamping member 103 so that upon releasing of the cap screws 73 a screwdriver may be placed between the stop means or member 106 on flange 104 and the surface of the cutout 108 and twisted to adjust the section 98 upwardly. When proper adjustment is achieved the cap screws 73 are simply tightened to lock the sections in place.

A section of the upper slat carrying chain 116, which is of conventional roller link construction, is shown in Fig. 2. The slats 17 are pivotally mounted on the chain 116 through the provision of hinge elements 117 which mount on the pivot pins 118 of the chain links. The chain travels in the direction indicated by arrow C with slats 17 and spindles 78 reclined for passage through the stripping mechanism. As the spindles 78 are drawn between adjacent sections 62, 63 (Fig. 1) the cotton is slid axially off the ends of the spindles and impelled by the deflecting members 82 and doffer 83 onto the flights 119 of the endless belt type conveyer 91 which moves the cotton to a point of storage not shown.

During operation it is desirable that the stripping sections begin their stripping action at the base 122 of the spindles 78, that is, as close as possible to the slats 17 so that any cotton wound on the spindle adjacent the slats 17 will be stripped. To facilitate close adjustment the nose portions 123 and 124 (Figs. 2 and 7) of sections 62 and 63 respectively, are chamfered or beveled. The nose portions 123 and 124 terminate in upturned end walls 126, 127 respectively, which join with the stripping edges 66' and 67' for purposes of stiffening. The beveled nose portion 124 is dimensioned to nestle within the nose portion 123. To adjust the stripper assembly in or out relative to the slats 17 in the directions of arrow A in Fig. 2 the carriage bolts 31, 32 and 36, 37 are first loosened. The adjusting nuts 26, 27 (Fig. 2) are threaded in or out as desired to move the assembly about the pivots 11 and 12 to present the beveled nose portions 123 and 124 of the stripper sections 62 and 63 closer or farther from the beveled edges 16 of the slats 17. When the desired adjustment is reached, the nuts are locked against bracket 22 and carriage bolts 31, 32 and 36, 37 are tightened thus rigidly securing the assembly in place.

The stripping assembly above described provides for fast accurate alignment to define stripping gaps 128 (Fig. 1) on center with the horizontal paths of travel of the spindles 78 without the use of expensive jigs or fixtures. The desired adjustability of the gaps for proper running clearance is not interfered with and accurate realignment of gap centers can be achieved in the field when replacing a series of stripping sections 62 and 63. The shielding structure 82 for the doffer 83 is formed integral with the clamping members 74 (Fig. 5) and presents only a sufficient open area for running clearance of the doffer wheels 86 and spindles 78.

It should be understood that it is not intended to limit the invention to the particular form and details herein shown and described, and that the invention includes such other forms and modifications as are embraced by the appended claims.

What is claimed is:

1. In a spindle stripper mechanism for cotton harvesters the combination of a support, a series of first stripping sections mounted on said support and presenting horizontal stripping edges respectively, each of said first sections having a mounting aperture therethrough; a series of second stripping sections corresponding in number to the number of said first stripping sections each having a mounting opening therethrough of a greater extent than said apertures in first sections, said second sections mounted on said support in overlying relation to said first sections, respectively, with said openings thereof in registry with said apertures in said first sections; and adjustable connecting means mounted on said support and passing through said openings and snugly rceived through said apertures to fixedly mount said first sections on said support at predetermined vertical spacings from each other and to adjustably secure said second sections in stripping gap forming relation relative to said first stripping sections.

2. In a spindle stripper mechanism for cotton harvesters the combination of a support, and a series of stripping elements mounted on said support in vertically spaced stripping gap forming relation to each other; each of said stripping elements comprising a first stripping section presenting a stop portion, and a second stripping section mounted in overlying relation to said first section; and releasable fastening means mounting said first and second sections on said support in adjustably fixed relation relative to each other, said releasable fastening means having gauging means thereon at a fixed predetermined position and adapted for engagement by said stop portion, said first section being mounted on said support with said stop portion in abutting engagement with said gauging means so as to determine a fixed position of vertical adjustment of said first section.

3. The structure recited in claim 2 wherein said first and second sections have vertically elongated mounting apertures and openings respectively in registry with each other, said connecting means including a clamping member having a gauging edge for abutting engagement with said stop means on said first section and apertures therethrough in registry with said apertures and openings of said first and second sections, and screw means passing through said registering openings and apertures and having an enlarged shoulder in load transmitting engagement with said clamping member.

4. A spindle stripper assembly for cotton harvesters comprising in combination a support, a series of first stripping sections positioned on said support and presenting horizontal stripping edges, respectively, at predetermined vertical spacings from each other; a series of second stripping sections, positioned on said support and presenting horizontal stripping edges in gap forming relation to said first stripping sections; a member rotatably mounted on said support and having a vertically spaced series of horizontally extending doffing elements positioned thereon to form extensions of said stripping edges of one of said series of sections; adjustable connecting means mounting said first and second sections on said support and including a series of clamping members in load transmitting engagement with said first and second sections, each of said clamping members having a guard element extending in generally oblique relation thereto into shielding relation to said rotatable member, and dimensioned to snugly interfit in the space between said doffing elements.

5. The structure defined in claim 4 wherein said guard element includes a neck portion extending from said clamping member radially toward said rotatable member, an arcuate intermediate portion dimensioned to snugly interfit in the space between said doffing elements and a tapered end portion extending beyond said elements.

6. In a spindle stripper mechanism for cotton harvesters, the combination of a support; a series of first stripping sections presenting horizontal stripping edges, respectively; a series of second stripping sections presenting horizontal stripping edges, respectively; and means operatively mounting said first and second stripping sections on said support to present said stripping edges of said first sections at fixed predetermined vertical spacings from one another, and to present said stripping edges of said second sections in adjustably fixed gap forming relation, respectively, to said stripping edges of said first sections while said stripping edges of said first sections are retained at said fixed vertical spacings from one another.

7. In a spindle stripper mechanism for cotton harvesters, the combination of a support; a series of first stripping sections presenting horizontal stripping edges, respectively; a series of second stripping sections presenting horizontal stripping edges, respectively; and selectively engageable and disengageable fastening means for mounting said first and second stripping sections on said support so as to present said stripping edges of said first sections in gap forming relation to said stripping edges of said second sections; each of said first stripping sections having a stop portion, and said fastening means having gauging means thereon at a fixed predetermined position in abutting engagement, respectively, with said stop portions so that upon engagement of said fastening means all of said first and second stripping sections will be rigidly secured to said support and so that disengagement of said fastening means will release said second stripping sections for stripping gap adjusting movement relative to said first stripping sections while the latter are being retained at fixed predetermined distances from each other by said abutting engagement of said gauging means with said stop portions.

References Cited in the file of this patent

UNITED STATES PATENTS

| | | |
|---|---|---|
| 2,629,221 | Rust | Feb. 24, 1953 |
| 2,665,535 | Rust | Jan. 12, 1954 |
| 2,798,352 | Gray | July 9, 1957 |